Figure 4:
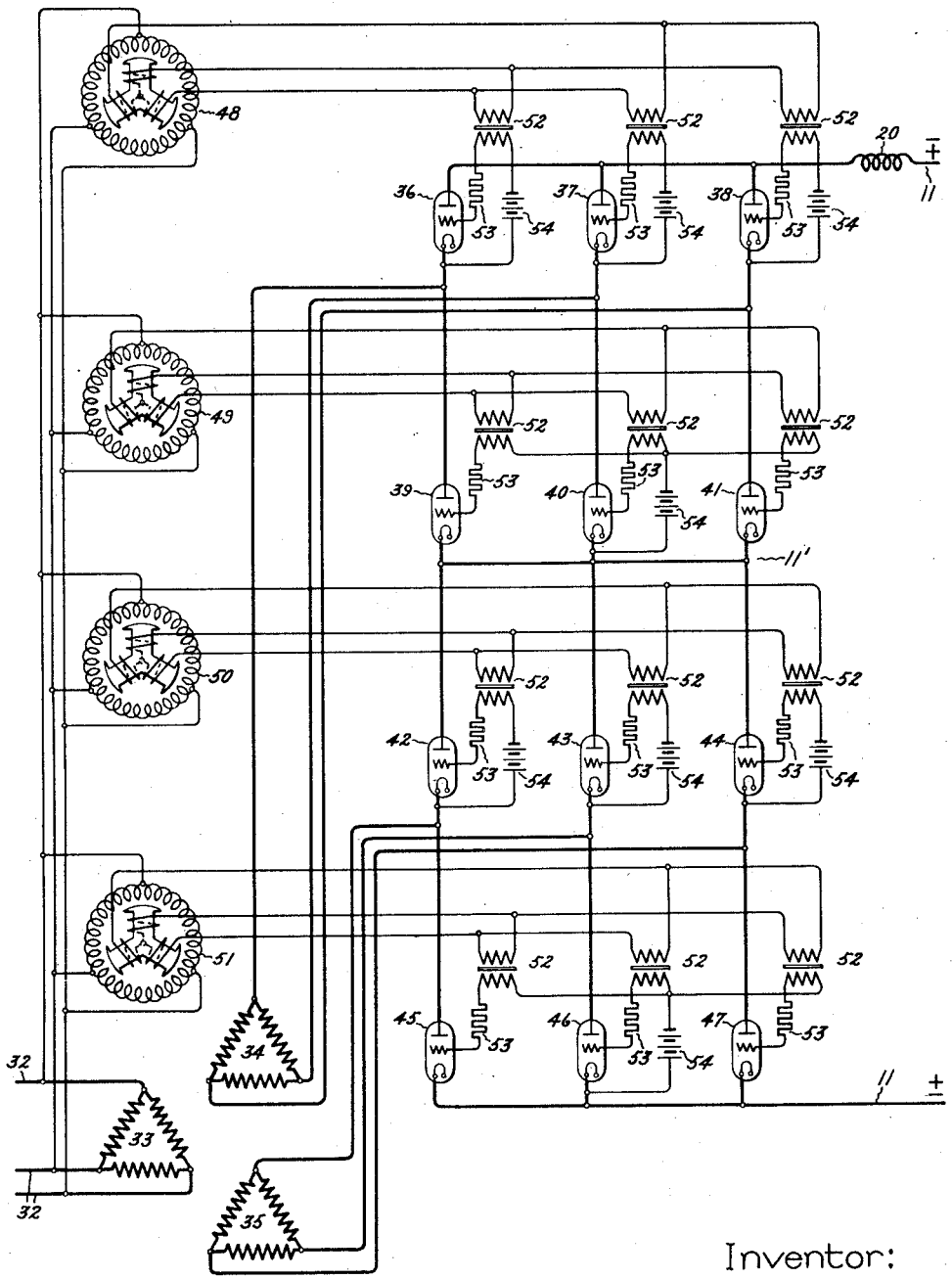

Jan. 16, 1934.   B. D. BEDFORD   1,944,060
ELECTRIC VALVE CONVERTING APPARATUS AND METHOD OF OPERATING THE SAME
Filed Sept. 23, 1932   3 Sheets-Sheet 1
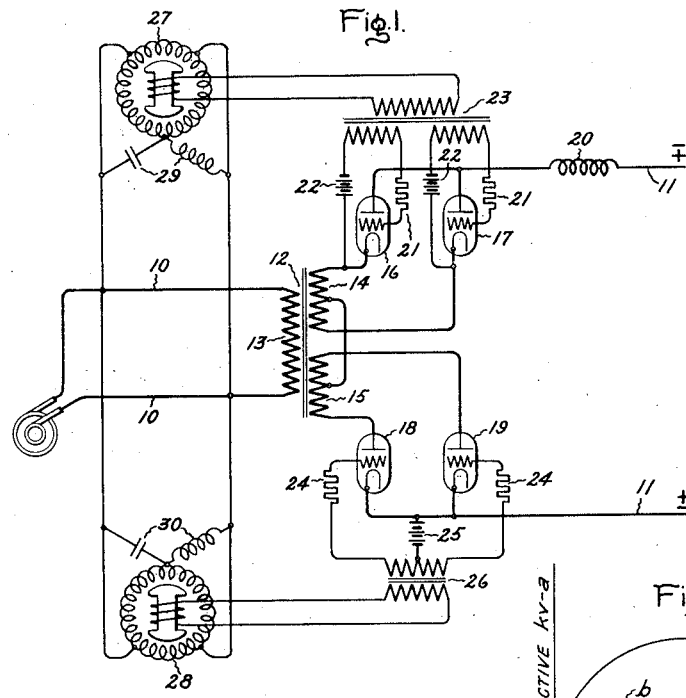
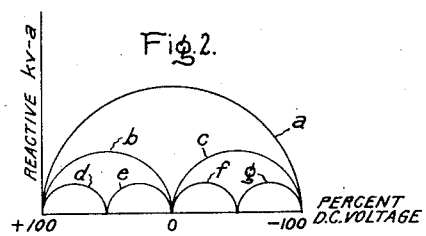
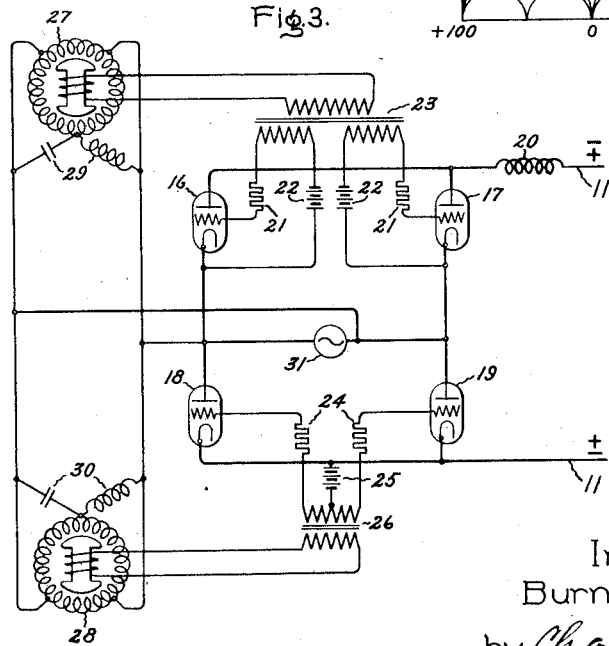
Inventor:
Burnice D. Bedford,
by Charles E. Tullar
His Attorney.

Jan. 16, 1934. B. D. BEDFORD 1,944,060
ELECTRIC VALVE CONVERTING APPARATUS AND METHOD OF OPERATING THE SAME
Filed Sept. 23, 1932  3 Sheets-Sheet 2

Inventor:
Burnice D. Bedford,
by Charles E. Mullen
His Attorney.

Jan. 16, 1934.  B. D. BEDFORD  1,944,060
ELECTRIC VALVE CONVERTING APPARATUS AND METHOD OF OPERATING THE SAME
Filed Sept. 23, 1932  3 Sheets-Sheet 3

Inventor:
Burnice D. Bedford,
by Charles E. Tullar
His Attorney.

Patented Jan. 16, 1934

1,944,060

UNITED STATES PATENT OFFICE 1,944,060

ELECTRIC VALVE CONVERTING APPARATUS AND METHOD OF OPERATING THE SAME

Burnice D. Bedford, Schenectady, N. Y., assignor to General Electric Company, a corporation of New York Application September 23, 1932
Serial No. 634,546

13 Claims. (Cl. 171—97)

My invention relates to electric valve converting apparatus and a method of operating the same and more particularly to such apparatus adapted to convert and control the energy transmitted between two electric circuits.

Heretofore, there have been devised numerous electric valve converting apparatus suitable for transmitting energy between direct and alternating current circuits, between direct current circuits of different voltages, or between independent alternating current circuits of the same or different frequencies. In each case the electric valve converting apparatus includes an alternating current circuit which may be either an intermediate alternating current circuit or the alternating current supply or load circuit. In such apparatus it has been customary to control the amount of energy transmitted between the two circuits or the relative voltages of the two circuits or both, by applying to the grids of the valves alternating potentials and varying the phase of these alternating potentials with respect to the potential of the alternating current circuit. However, the phase of the alternating grid potential determines the phase of the valve currents and thus the power factor on the alternating current circuit. In the usual circuits, containing substantial inductance, a displacement in the phase of the grid potentials of approximately 90 electrical degrees corresponds to the maximum controlling effect. In the arrangements of the prior art, however, a displacement in phase of the grid potentials of substantially 90 electrical degrees corresponds to a power factor on the alternating current circuit approaching zero; that is, a current of the same order of magnitude as a full load current may flow but it will be substantially all wattless current. The occurrence of these extremely low power factor currents on the alternating current circuit is usually highly undesirable from an operating standpoint, particularly in the case where energy is being received through a transmission circuit.

It is an object of my invention, therefore, to provide an improved electric valve converting apparatus and a method of operating the same which will overcome the above mentioned disadvantages of the arrangements of the prior art, and which will be simple and reliable in operation.

It is another object of my invention to provide an improved electric valve converting apparatus and a method of operating the same by means of which the energy transmitted between two electric circuits may be readily controlled and the power factor on the alternating current circuit of the apparatus substantially improved.

It is a further object of my invention to provide an improved electric valve converting apparatus for transmitting energy from a source of alternating current to a direct current circuit by means of which the average voltage on the direct current circuit may be controlled from maximum to substantially zero and in which the power factor on the alternating current circuit approaches unity as the voltage of the direct current circuit approaches zero.

It is a still further object of my invention to provide an improved electric valve converting apparatus for transmitting energy from a direct current circuit to an alternating current load circuit in which the voltage of the alternating current circuit may be controlled over a wide range and in which the power factor on the alternating current circuit approaches unity as the voltage thereof approaches its maximum value.

In accordance with my invention, a pair of electric circuits are interconnected through an electric valve converting apparatus including two serially connected groups of electric valves. The valves are so controlled as to give a type of regulation analagous to that of the well known induction regulator in which an alternating voltage is controlled by a regulating voltage variable in magnitude and polarity so as to either buck or boost the alternating voltage of constant value. In accordance with my invention, one of the serially connected groups of valves is controlled to supply a substantially constant voltage to the load circuit of the apparatus, while the other group of valves is controlled to either boost or buck this voltage. For example, in transmitting energy from an alternating current circuit to a direct current circuit through an electric valve converting apparatus comprising two serially connected groups of electric valves, one group of valves may be operated continuously as rectifying valves. For maximum voltage on the direct current the other group of valves is also operated as rectifying valves, boosting the voltage supplied by the first group of valves. The average voltage of the direct current circuit can then be decreased by retarding the phase of the grid potentials of the second group of valves to substantially 90 degrees lagging when the second group of valves is neither bucking nor boosting. By still further retarding the grid potentials of the second group of valves they operate as inverters, bucking the average voltage of the direct current circuit and feeding back into the alternating current circuit. Similarly, when transmitting energy from a direct current circuit to an alternating current circuit, that is, with the valve converting apparatus operating as an inverter, the two groups of serially connected valves may be controlled independently in a similar manner, as will be described in more detail hereinafter.

Figure 5:
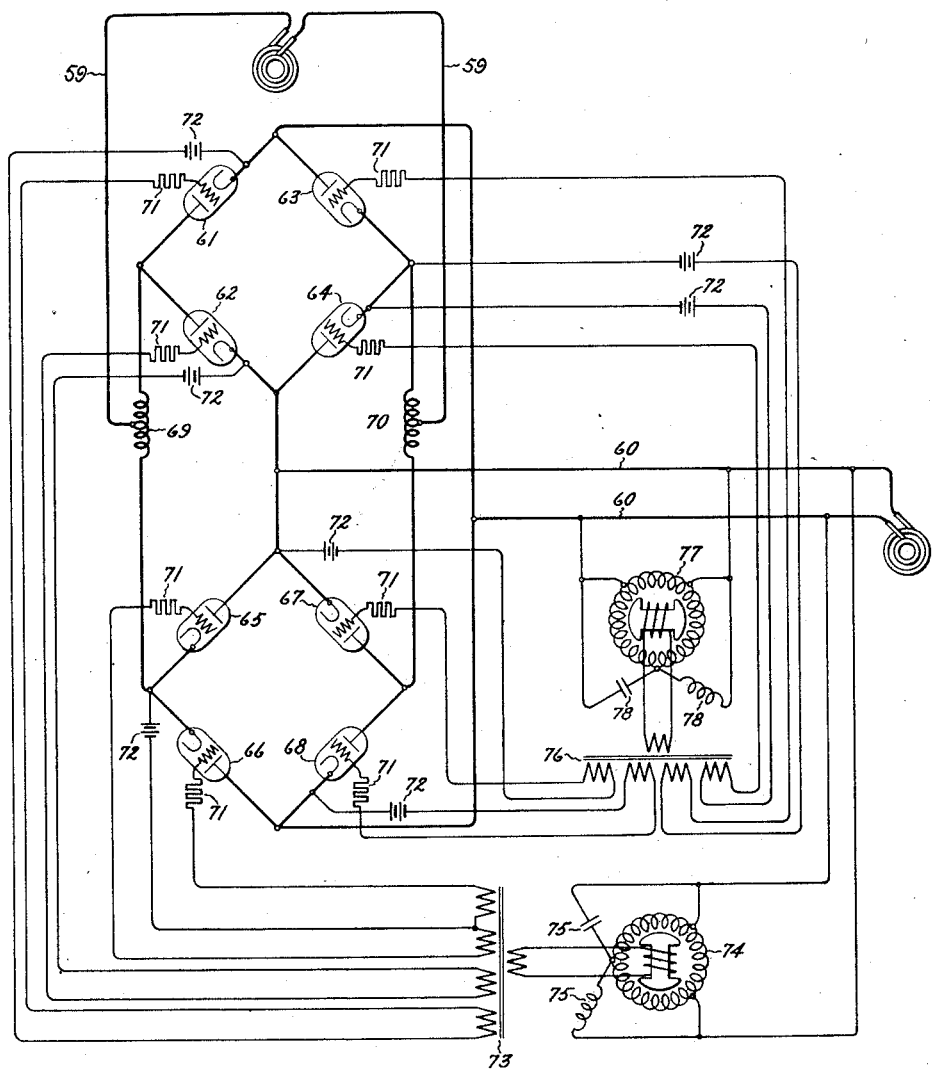

For a better understanding of my invention, together with other and further objects thereof, reference is had to the following description taken in connection with the accompanying drawings, and its scope will be pointed out in the appended claims. Referring to the drawings, Fig. 1 illustrates an electric valve converting apparatus embodying my invention for transmitting energy between direct and alternating current circuits; Fig. 2 is a diagram representing certain operating characteristics of the arrangement of Fig. 1; Fig. 3 is a simplification of, and the electrical equivalent of, the arrangement of Fig. 1; Fig. 4 illustrates an application of my invention to a polyphase circuit and an extension thereof to the use of four serially connected groups of electric valves, while Fig. 5 shows an electric valve converting apparatus embodying my invention for transmitting energy between two single phase alternating current circuits.

Referring now more particularly to Fig. 1 of the drawings, there is shown an arrangement for transmitting energy between a single phase alternating current circuit 10 and a direct current circuit 11. This apparatus comprises a transformer 12 provided with a winding 13 connected to the alternating current circuit 10 and a pair of windings 14 and 15 for connection to the direct current circuit. The end terminals of the winding 14 are connected to one side of the direct current circuit 11 through electric valves 16 and 17; the end terminals of the winding 15 are connected to the other side of the direct current circuit through electric valves 18 and 19, while the electrical midpoints of the windings 14 and 15 are directly interconnected. Thus each of the windings 14 and 15 with its associated valves comprises an independent electric valve converting apparatus and these two apparatus are serially connected across the direct current circuit 11. A current smoothing reactor 20 is preferably included in the direct current circuit as illustrated. Each of the electric valves 16-19, inc., is provided with an anode, a cathode, and a control grid and may be of any of the several types well known in the art, although I prefer to use valves of the vapor electric discharge type. In order to control the conductivity of the valves 16 and 17 their grids are connected to their respective cathodes through current limiting resistors 21, negative bias batteries 22, and independent secondary windings of a grid transformer 23. Similarly, the grids of the valves 18 and 19 are connected to their common cathode circuit through current limiting resistors 24, a negative bias battery 25 and opposite halves of the secondary winding of a grid transformer 26. The primary windings of the grid transformers 23 and 26 may be energized from the alternating current circuit 10 through any suitable phase shifting arrangement, although I have shown by way of example, rotary phase shifting transformers 27 and 28, energized from the alternating current circuit 10, through phase splitting circuits 29 and 30, respectively. However, in case the apparatus is to operate as a rectifier transmitting energy from the alternating current circuit 10 to the direct current circuit 11, the grid control circuit of one of the groups of valves may be omitted.

The operation of the above described apparatus as a rectifier will be considered first. Neglecting the grid excitation of the several electric valves and assuming that the lower terminals of the several windings of the transformer 12 are positive at a given instant, current will flow from the lower terminal of the winding 15 through electric valve 18, direct current circuit 11, electric valve 16, the upper portion of the winding 14 and the neutral connection between the windings 14 and 15. During alternate half cycles current will flow from the upper terminal of the winding 15, electric valve 19, direct current circuit 11, electric valve 17, the lower portion of the winding 14 and the connection between the neutrals of the windings 14 and 15. Thus, in effect, each of the windings 14 and 15 with its associated valves acts as an independent rectifier, the two rectifiers being connected in series across the direct current circuit.

As is well understood by those skilled in the art, if the grid potentials of the several electric valves be simultaneously retarded by means of the phase shifting transformers 27 and 28, the average voltage of the direct current circuit may be gradually decreased. As the average voltage of the direct current circuit decreases, assuming a constant current in the load circuit and a constant voltage on the alternating current circuit, the current in the alternating current circuit will remain substantially constant, but the power factor angle will increase so that the reactive component of the alternating current will correspondingly increase. The relation between the reactive $kv$—a. and the percentage voltage on the direct current circuit from full rectifying to full inverting is illustrated by curve $a$ of Fig. 2. From this figure it is seen that, in the normal regulation of the voltage of the direct current circuit from maximum to substantially zero, very large reactive currents are produced in the alternating current circuit 10. The low power factors on the alternating current circuit 10 resulting from these reactive currents have well known disadvantages.

If now the grid potentials of one group of electric valves, for example, valves 16 and 17, are set in phase with their respective anode potentials, or in case the grid circuits of these valves are entirely omitted, the apparatus comprising these valves and their associated inductive winding will operate continuously as a straight rectifier producing a component of current in the alternating current circuit 10 which is always at unity power factor. By retarding the grid potentials of the other group of electric valves, 18 and 19, the average voltage produced by their rectifying apparatus is progressively decreased, at the same time producing a lagging component of current in the alternating current circuit 10. The relation between the reactive current produced by this rectifier and the percentage of voltage of the direct current circuit is illustrated by the curve $b$ of Fig. 2. Thus, when the grid potentials of valves 18 and 19 are displaced in phase substantially 90 electrical degrees lagging so that the average voltage supplied by this rectifying apparatus is substantially zero, the component of reactive $kv$—a. produced in the circuit 10 is reduced to the maximum value of the curve $b$ and the apparatus as a whole is operating to supply the direct current circuit 11 at approximately 50 per cent normal voltage, but still at a power factor very much higher than would be the case if all of the electric valves were grid controlled to produce the same average voltage as represented by the curve a. By still further retarding the grid potential of electric valves 18 and 19 beyond the 90 degree point, the energy component of this current is reversed; that is, valves 18 and 19 with their associated winding 15 operate as an inverter feeding back energy received from the rectifying apparatus to the alternating current circuit 11. When the grid excitation of the valves 18 and 19 is only slightly beyond the 90 electrical degree point, however, and the current supplied to the circuit 11 by the inverting apparatus is substantially reactive, only a small portion of the unidirectional voltage supplied by the rectifying apparatus is consumed in feeding back this reactive current to the circuit 10. As the grid potential of the valves 18 and 19 is progressively retarded the energy component becomes larger and the reactive component becomes smaller until, with a phase displacement of substantially 180 electrical degrees (less the necessary commutating angle) the apparatus is operating at minus unity power factor. That is, substantially all of the unidirectional voltage supplied by the rectifying apparatus is consumed in feeding back the energy to the alternating current circuit so that the resultant voltage on the direct current circuit is reduced to substantially zero. Thus it is seen that the reactive kv—a. appearing in the alternating current circuit 10 as represented by the curve b, when controlling the voltage of the direct current circuit from maximum to substantially zero, is considerably less than when the same phase control is effected by shifting the phase of the grid potentials of all of the several electric valves the characteristics of which are represented by the curve a.

In the above described operation of the apparatus as a rectifier with an assumed constant voltage on the alternating current circuit, the retarding of the phase of the grid potentials with respect to the anode potentials decreases the voltage of the direct current circuit, and thus the ratio of the voltage of the direct current circuit to that of the alternating current circuit. Similarly, when operating the above described apparatus as an inverter, transmitting energy from the direct current circuit 11 to the alternating current circuit 10, a shift in the phase of the grid potential decreases the ratio of the voltage of the direct current circuit to that of the alternating current circuit as illustrated by the curve c of Fig. 2. However, since the voltage of the direct current circuit is normally maintained constant for inverter operation, the voltage of the alternating current circuit is necessarily increased by shifting the phase of the grid potentials of one group of valves. For example, in operating the above described apparatus as an inverter, transmitting energy from the direct current circuit 11 to the alternating current circuit 10, the voltage of the alternating current circuit 10 may be increased by advancing the phase of the grid potentials of the several electric valves, but this increase in voltage is accompanied by a large increase in the reactive kv—a. on the alternating current circuit. By maintaining the grid potentials of one group of valves advanced in phase with respect to the potential of the alternating current circuit only by the necessary commutating angle, the voltage of the alternating current circuit may be substantially increased by advancing the phase of the grid potentials of the other group of valves to substantially the 90 electrical degree point, when the voltage of the alternating current circuit will be substantially doubled and the reactive kv—a. will be a minimum, as represented by the maximum value of the curve c. By still further advancing the phase of the grid potentials beyond the 90 electrical degree point, the second group of valves now act as a rectifier feeding back energy from the alternating current circuit 10 to the direct current circuit 11, as in the case when the apparatus is operating as a rectifier. In this manner, the voltage of the alternating current circuit 10 can be controlled within wide limits and at the same time the reactive kv—a. of the alternating current circuit substantially decreased.

If, in the arrangement of Fig. 1 the winding 14 is identical to the winding 15, the upper terminals of these two windings will be at the same potential since their electrical midpoints are interconnected, similarly their lower terminals will be at the same potential so that they may be connected directly in parallel or replaced by a single winding or a single source of alternating current. This latter arrangement is illustrated in a simplified diagram shown in Fig. 3, in which the transformer 12 and the alternating current circuit 10 are replaced by a single alternating current source, or circuit, 31. Obviously, the operation of this circuit illustrated in Fig. 3 will be in all respects identical to that of Fig. 1, since it is the full electrical equivalent. The arrangement of Fig. 3 is the simpler and preferable form but Fig. 1 is included to aid in the explanation of the operation.

There is illustrated in Fig. 4 an extension of my invention suitable for transmitting energy between a polyphase alternating current circuit 32 and a direct current circuit 11 by means of two pairs of groups of electric valves, all of the groups being connected serially across the direct current circuit. This apparatus comprises a polyphase transformer bank comprising a network 33 connected to the polyphase circuit 32 and the networks 34 and 35. the network 34 feeding the direct current circuit 11—11' through the groups of valves 36—37—38 and 39—40—41 and the network 35 being interconnected with the network 11'—11 through the groups of valves 42—43—44 and 45—46—47. The grids of these groups of valves are excited with alternating potentials variable in phase with respect to that of the alternating current circuit 32 through rotary phase shifting transformers 48, 49, 50, and 51, respectively, the grid of each valve being excited from the proper phase of its associated phase shifting transformer through a grid transformer 52, a current limiting resistor 53 and a negative bias battery 54. As in the arrangement of Fig. 1, if the apparatus is to operate only as a rectifier, the grid excitation circuit of one group of valves of each pair may be omitted.

As in the arrangement of Fig. 1, with the apparatus operating as a rectifier, the average voltage of the direct current circuit 11 can be controlled by simultaneously retarding the phase of the grid potentials of all of the several electric valves. However, this type of regulation entails excessive reactive kv—a. on the alternating current circuit. By retarding the phase of the grid potentials of one group of one pair, for example, electric valves 39—40—41, through substantially 180 electrical degrees, the average voltage of the direct current circuit may be reduced and the reactive kv—a. flowing in the alternating current circuit 32 will be as indicated by the curve d of Fig. 2. By then successively retarding the grid potentials of the valves of a group of the other pair, for example, valves 45, 46 and 47, the regulation characteristic indicated by the curve e of Fig. 2 will be obtained to reduce the average voltage of the direct current circuit to substantially zero. The operation of the apparatus as an inverter with constant voltage on the alternating current circuit is represented by the curves f and g of Fig. 2. When the apparatus is operating as an inverter transmitting energy from the direct current circuit 11 to the alternating current circuit 32, the voltage of the circuit 32 may be progressively increased in a manner similar to that of the apparatus of Fig. 1 with a minimum of reactive kv—a. on the alternating current circuit.

In Fig. 5 there is shown an electric valve frequency changing apparatus embodying my invention for transmitting energy from an alternating current supply circuit 59 to an alternating current load circuit 60. This apparatus consists essentially of a pair of inverting apparatus of the type shown in Fig. 3 reversely connected in parallel across the alternating current circuit 59, each of these inverting apparatus operating during alternate half cycles of the supply current; for example, one of the inverting apparatus comprises electric valves 61, 62, 63 and 64 connected in a bridge circuit as in the arrangement of Fig. 3, while the other comprises the electric valves 65, 66, 67 and 68, oppositely connected with respect to the first mentioned group of valves. The output circuit 60 is connected to the alternating current side of these two inverting apparatus in parallel, while the connection from the supply circuit 59 to these inverting apparatus is made through midtapped reactors 69 and 70, which provide the reactance necessary to secure the type of operation described above. The grids of the two pairs of valves 61 and 62, and 65 and 66, are excited through current limiting resistors 71, negative bias batteries 72, and the several windings of a grid transformer 73, the primary winding of which is energized from the circuit 60 through a rotary phase shifting transformer 74 and a phase splitting circuit 75. Similarly, the grids of the two pairs of valves 63 and 64, and 67 and 68 are excited through current limiting resistors 71, negative bias batteries 72 and the several secondary windings of a grid transformer 76, the primary winding of which is energized from the circuit 60 through a rotary phase shifting transformer 77 and a phase splitting circuit 78.

The operation of the circuit of Fig. 5 is in all respects similar to that described in connection with Figs. 1 and 3. During half cycles when the left-hand terminal of the circuit 59 is positive, for example, the inverting apparatus comprising the valves 61—64, inc., will supply alternating current to the circuit 60, while during the remaining half cycles, current will be supplied through the inverting apparatus comprising valves 65—68, inc. By retarding the phase of the grid potentials of two of the groups of electric valves, for example, group 61—62 and 65—66, through substantially 180 electrical degrees with respect to the potential of the alternating current circuit 60, and gradually advancing the phase of the grid potentials supplied to the electric valves 63 and 64, and 67 and 68, by means of the rotary phase shifting transformer 77, the voltage in the alternating current circuit 60 may be raised to any desired value without the occurrence of excessive wattless currents in the alternating current circuit 60. While in Fig. 5 I have illustrated my invention as applied to an arrangement for transmitting energy from a single phase alternating current circuit of lower frequency to a single phase alternating current circuit of higher frequency, it will be obvious to those skilled in the art that it is equally applicable to polyphase electric valve frequency changing apparatus for transmitting energy between alternating current circuits of any relative frequencies.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. The method of controlling the energy transmitted between a supply circuit and a load circuit by means of an electric valve converting apparatus including an alternating current circuit and a pair of serially connected groups of electric valves which comprises operating one of said groups of valves at substantially unity power factor with respect to said alternating current circuit and varying the power factor of the current in the other group of valves.

2. The method of controlling between maximum and minimum values the energy transmitted between a supply circuit and a load circuit by means of an electric valve converting apparatus including an alternating current circuit and a pair of serially connected groups of valves which comprises operating one of said groups of valves at substantially unity power factor with respect to said alternating current circuit, and varying the power factor of the current in the other group between plus and minus unity.

3. The method of controlling the energy transmitted between a supply circuit and a load circuit by means of an electric valve converting apparatus including an alternating current circuit and a pair of serially connected groups of grid controlled electric valves which comprises applying alternating potentials to the grids of only one of said groups of valves and retarding the phase of said alternating potentials with respect to the potential of said alternating current circuit.

4. The method of controlling the voltage of the direct current circuit of a rectifying apparatus including a pair of serially connected groups of electric valves which comprises operating both of said groups of valves as rectifiers for a higher range of voltages on said direct current circuit, and operating one group of valves as rectifiers and the other group of valves as inverters for a lower range of voltages on said direct current circuit.

5. The method of controlling the voltage of the direct current circuit of a rectifying apparatus including a pair of serially connected groups of grid controlled electric valves which comprises applying alternating potentials to the grids of only one of said groups of valves and retarding the phase of said alternating potentials with respect to that of the alternating current circuit of the rectifier.

6. The method of controlling from a maximum to substantially zero the voltage of the direct current circuit of a rectifying apparatus including a pair of serially connected groups of grid controlled electric valves which comprises applying alternating potentials to the grids of only one of said groups of valves and retarding the phase of said alternating potentials from zero to substantially 180 electrical degrees with respect to the potential of the alternating current circuit of the rectifier.

7. The method of controlling the voltage of the alternating current circuit of an inverting apparatus including a pair of serially connected groups of electric valves which comprises exciting both of said groups of valves for inverter operation for a lower range of voltages on said alternating current circuit, and exciting one group of valves for inverter operation and the other group of valves for rectifier operation for a higher range of voltages on said alternating current circuit.

8. The method of controlling from minimum to maximum values the voltage of the alternating current circuit of an inverting apparatus including a pair of serially connected groups of grid-controlled electric valves which comprises applying to the grids of one of said groups of valves alternating potentials substantially in phase opposition to the potential of said alternating current circuit and applying to the grids of the other group of valves alternating potentials variable in phase with respect to that of said alternating current circuit from substantially phase opposition to substantially phase coincidence.

9. In combination, a supply circuit, a load circuit, electric valve converting apparatus interconnecting said circuits and including a pair of serially connected groups of electric valves, and means for controlling the energy transmitted between said circuits comprising means for varying the conductivity of one of said groups of valves independently of that of the other group.

10. In combination, a supply circuit, a load circuit, electric valve converting apparatus interconnecting said circuits and including a pair of serially connected groups of electric valves each provided with a control grid, and means for controlling the effective voltage of said load circuit from a maximum to substantially zero comprising means for independently applying to the grids of one of said groups of valves alternating potentials variable in phase through substantially 180 electrical degrees.

11. In combination, a direct current supply circuit, an alternating current load circuit, electric valve converting apparatus interconnecting said circuits and including a pair of serially connected groups of grid controlled electric valves, and means for controlling the voltage of said load circuit comprising means for exciting the grids of one of said groups of valves for inverter operation, and means for independently exciting the grids of the other of said groups of valves for rectifier or inverter operation.

12. In combination, a direct current supply circuit, an alternating current load circuit, electric valve converting apparatus interconnecting said circuits and including a pair of serially connected groups of grid controlled electric valves, and means for controlling the voltage of said load circuit comprising means for impressing upon the grids of one of said groups of valves alternating potentials substantially in phase opposition to that of said alternating current circuit, and means for impressing upon the grids of the other of said groups of valves alternating potentials variable in phase from substantial phase opposition to substantial phase coincidence.

13. In combination, an alternating current supply circuit, an alternating current load circuit, electric valve converting apparatus interconnecting said circuits and including two pairs of groups of electric valves, the groups of each pair being connected in series and said pairs of groups being oppositely connected with respect to said supply circuit, and means for controlling the energy transmitted between said circuits comprising means for varying the conductivity of the valves of one of said groups of each pair independently of that of the other groups of said pairs.

BURNICE D. BEDFORD.